US008297781B2

(12) United States Patent
Cheang et al.

(10) Patent No.: US 8,297,781 B2
(45) Date of Patent: Oct. 30, 2012

(54) MULTI-COLOR ILLUMINATING BACK LIGHT STRUCTURE

(75) Inventors: Tak Meng Cheang, Sg Nibong (MY); Boon Keat Tan, Singapore (SG); Scott Weitzel, Brighton, CO (US)

(73) Assignee: Intellectual Discovery Co., Ltd., Seoul (KR)

( * ) Notice: Subject to any disclaimer, the term of this patent is extended or adjusted under 35 U.S.C. 154(b) by 245 days.

(21) Appl. No.: 12/429,928

(22) Filed: Apr. 24, 2009

(65) Prior Publication Data

US 2010/0271842 A1 Oct. 28, 2010

(51) Int. Cl.
*F21V 9/00* (2006.01)
(52) U.S. Cl. ........................................ 362/230; 362/625
(58) Field of Classification Search .................. 362/606, 362/612, 230–231, 601, 625
See application file for complete search history.

(56) References Cited

U.S. PATENT DOCUMENTS

| | | | | |
|---|---|---|---|---|
| 4,373,282 A | * | 2/1983 | Wragg | 40/546 |
| 5,575,549 A | * | 11/1996 | Ishikawa et al. | 362/625 |
| 5,833,344 A | * | 11/1998 | Arai et al. | 362/620 |
| 6,346,973 B1 | | 2/2002 | Shibamoto | |
| 6,561,659 B1 | * | 5/2003 | Hsu | 362/24 |
| 6,914,719 B2 | * | 7/2005 | Koyama et al. | 359/361 |
| 7,029,935 B2 | | 4/2006 | Negley | |
| 7,052,152 B2 | * | 5/2006 | Harbers et al. | 362/30 |
| 7,086,761 B2 | * | 8/2006 | Won et al. | 362/373 |
| 7,446,274 B2 | | 11/2008 | Choi | |
| 7,465,961 B2 | | 12/2008 | Masuda | |
| 2002/0149943 A1 | * | 10/2002 | Obata | 362/339 |
| 2006/0268537 A1 | * | 11/2006 | Kurihara et al. | 362/34 |
| 2006/0285362 A1 | * | 12/2006 | Cho et al. | 362/633 |

FOREIGN PATENT DOCUMENTS

JP 2008071735 3/2008

* cited by examiner

*Primary Examiner* — Julie Shallenberger
(74) *Attorney, Agent, or Firm* — Fox Rothschild LLP

(57) ABSTRACT

In an embodiment, the invention provides a multi-color illuminating back light structure comprising a light guide, a reflector, at least one LED and a wavelength converter material. Micro-structures are formed on a first surface of the light guide. The reflector is attached to the first surface of the light guide. A wavelength converter material is deposited on a second surface of the light guide. At least one LED is optically coupled to at least one side of the light guide. A portion of light reflected from the micro-structures and the reflector is converted into light having at least one wavelength different from the wavelength of the reflected light. The light leaving the wavelength converter material comprises light with at least first and second wavelengths.

16 Claims, 7 Drawing Sheets

MULTI-COLOR ILLUMINATING BACK LIGHT STRUCTURE

BACKGROUND

Portable electronic equipment such as mobile phones, cordless phones and PDAs (Personal Digital Assistant) are currently very popular. The appearance of portable electronic equipment is becoming increasingly important. For example, housing covers for portable electronic equipment are used to meet the diversity of tastes of multiple users.

Light emitting diodes (LEDs) have many advantages over conventional light sources, such as incandescent, halogen and fluorescent lamps. These advantages include longer operating life, lower power consumption and smaller size. Consequently, LEDs are often used for illumination in portable electronic equipment.

LEDs may also be used to enhance the appearance of portable electronic equipment. Illuminating the casing of portable electronic equipment using one or more LEDs can create a visually pleasing effect.

DETAILED DESCRIPTION

Figure 1:
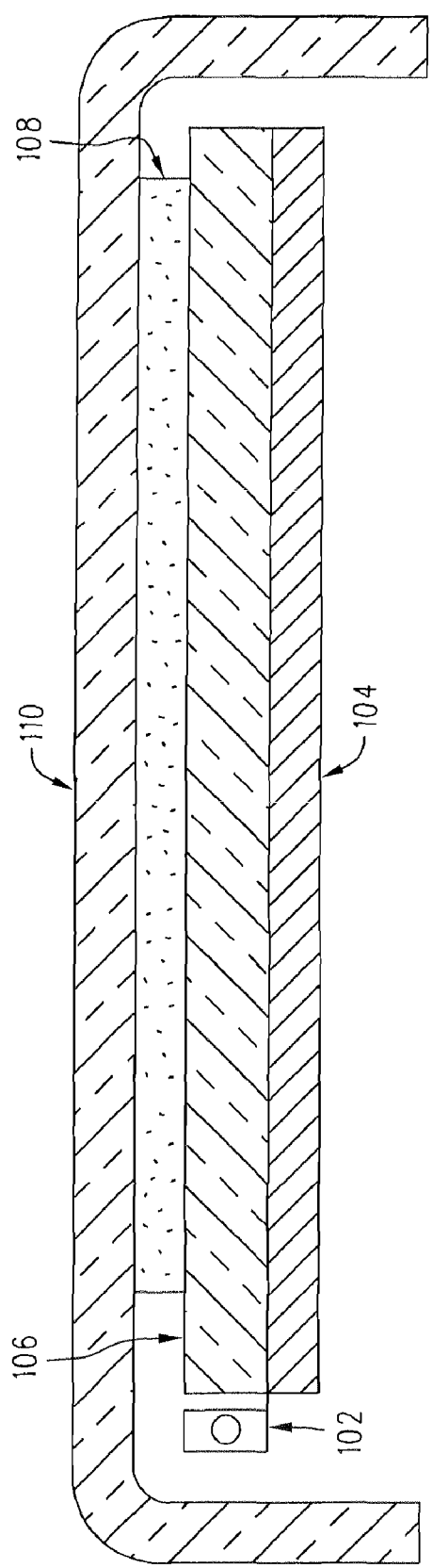
FIG. 1 is a sectional view of a multi-color illuminating back light structure and a casing in accordance with an exemplary embodiment of the invention.

The drawings and description, in general, disclose a multi-color illuminating back light structure 300. In one exemplary embodiment, light 202 from at least one LED 102 is optically coupled into an side 504 of a light guide 106. The light 202 is reflected from surfaces 502 and 512 of the light guide 106 because micro-structures 214 are formed on surface 502 of the light guide 106. The light 202 is also reflected from the surface 502 of the light guide 106 because a reflector 104 is attached to the surface 502 of the light guide 106.

In this exemplary embodiment, light, 208, 210 and 212 reflected from the surface 502 of the light guide 106 is directed to surface 512 of the light guide 106. The reflected light, 208, 210, and 212 leaves the surface 512 of the light guide 106 into a wavelength converter material 108. The wavelength converter material 108 converts a portion of the reflected light 208, 210 and 212 into light 310 and 312 having at least one different wavelength from the reflected light 208, 210 and 212.

In this exemplary embodiment, light leaving the wavelength converter material 108 may comprise many different wavelengths. Because the light leaving the wavelength converter material 108 may have many different wavelengths, multi-color light may be observed emanating from the wavelength converter material 108. For example, a "rainbow" or "jellyfish" color effect may be generated by the multi-color illuminating back light structure 300.

In this exemplary embodiment, the multi-color light emanating from the wavelength converter material 108 may be used, for example, to illuminate a translucent or transparent casing 110 used to encase portable electronic equipment. However, the multi-color illuminating back light structure 300 is not limited to use with portable electronic equipment.

FIG. 1 is a sectional view of a multi-color illuminating back light structure 300 and a casing 110 in accordance with an exemplary embodiment of the invention. In this exemplary embodiment, one or more LEDs 102 optically coupled to one or more sides 504, 506, 508, and 510 of a light guide 106 emit light into the light guide 106. The one or more LEDs 102 may, for example, emit blue, green, red, white, infra-red or ultra-violet electromagnetic radiation. However, the spectrum of electromagnetic radiation emitted by the one or more LEDs 102 is not limited to blue, green, red, white, infra-red or ultra-violet electromagnetic radiation. The light guide 106 in this example is made of an optical-grade polycarbonate material; however other materials may be used.

In this exemplary embodiment, light is reflected by a reflector 104 attached to a surface 502 of the light guide 106. The reflector 104, for example, may be a polymer film. In an exemplary embodiment, the reflector 104 reflects nearly all light in the visible spectrum independent of the angle of incidence of the light.

Light is also reflected by micro-structures 214 (not shown in FIG. 1) formed on surface 502 of the light guide 106. These micro-structures 214 are described in more detail below. The reflected light travels into the wavelength converter material 108.

A portion of the reflected light that travels into the wavelength converter material 108 is converted into light having different wavelengths from the reflected light. Phosphor, for example, may be used as a wavelength converter material 108. A plurality of types of phosphors may be used to create light having different wavelengths from each other. Not all of the reflected light is converted to different wavelengths. A portion of the reflected light leaves the wavelength converter material.

Phosphor when used as a wavelength converter material 108 is often used to convert light that has a shorter wavelength into light with a longer wavelength. For example, blue light may be converted into yellow, red, or green light depending on the type of phosphor properties used. The amount of phosphor used controls the saturation of the light generated by the phosphor. A europium phosphor is typically used to generate red light from blue light. Copper and aluminum doped zinc sulfide is typically used to generate green light from blue light. Cerium doped yttrium aluminum garnet phosphor or terbium based phosphor is typically used to generate yellow light from blue light.

In this exemplary embodiment, the light leaving the wavelength converter material 108 may comprise light having many different wavelengths. Because the light leaving the wavelength converter material 108 may have many different wavelengths, multi-color light may be observed emanating from the wavelength converter material 108. For example, a "rainbow" or "jellyfish" color effect may be generated by the multi-color illuminating back light structure 300.

In this exemplary embodiment, the multi-color light emanating from the wavelength converter material 108 may be used, for example, to illuminate a translucent or transparent casing 110 used to encase portable electronic equipment. However, the multi-color illuminating back light structure 300 is not limited for use with portable electronic equipment.

In another exemplary embodiment, electronic drivers circuits (not shown) are used to control the one or more LEDs 102 of the multi-color illuminating back light structure 300. By controlling which LEDs 102 are turned on and by controlling the intensity of the light of the LEDs that are turned on, dynamic multi-color light may be observed emanating from the wavelength converter material 108.

In another exemplary embodiment, external electronic control (not shown) are used to control the one or more LEDs 102 of the multi-color illuminating back light structure 300. By controlling which LEDs are turned on and by controlling the intensity of the light of the LEDs that are turned on, dynamic multi-color light may be observed emanating from the wavelength converter material 108.

Figure 2A:
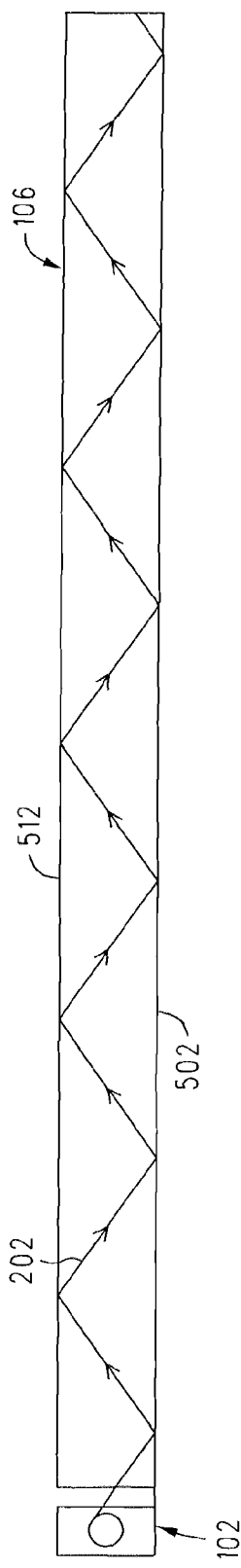
FIG. 2A is a drawing of a light guide and an LED in accordance with an exemplary embodiment of the invention.

FIG. 2A is a drawing of a light guide 106 and an LED 102 in accordance with an exemplary embodiment of the invention. FIG. 2A illustrates how light 202 from an LED 102 enters a light guide 106. Most of the light 202 is internally reflected in this example due to the angle of incidence. Surface 502 and surface 512 are substantially parallel to each other. However, if micro-structures 214 are formed on surface 502, the angle of incidence changes and more light 202 may exit surface 512. FIG. 2A is not drawn to scale.

Figure 2B:
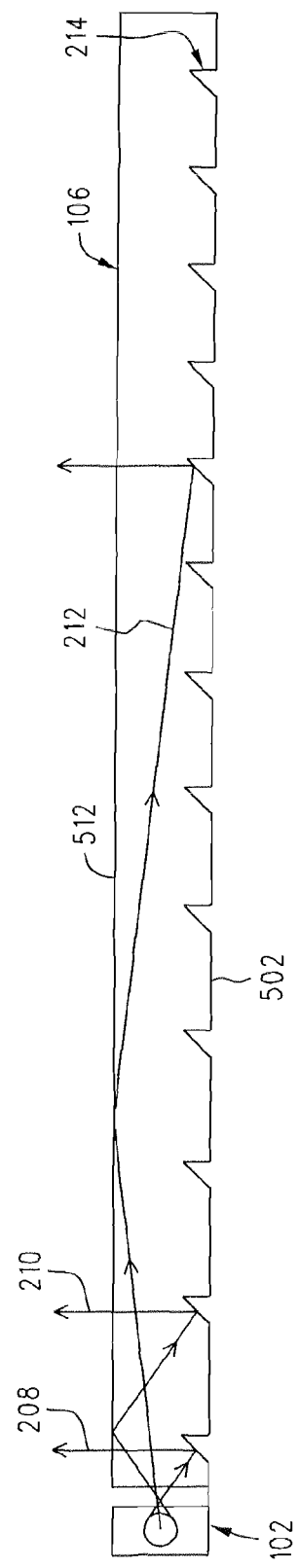
FIG. 2B is a drawing of a light guide, micro-structures and an LED in accordance with an exemplary embodiment of the invention.

FIG. 2B is a drawing of a light guide 106, micro-structures 214 and an LED 102 in accordance with an exemplary embodiment of the invention. In this illustration, micro-structures 214 are formed on surface 502. Micro-structures 214 may be formed by molding, hot pressing or other standard methods know in the art. Micro-structures 214 include but are not limited to diffusion spots, diffusion groves, diffusion pits and micro-lenses™. In FIG. 2B because micro-structures 214 are added, light 208, 210 and 212 is reflected from surface 502 through surface 512. FIG. 2B is not drawn to scale. The micro-structures 214 shown are enlarged relative to the light guide 106 for illustrative purposes only.

Figure 2C:
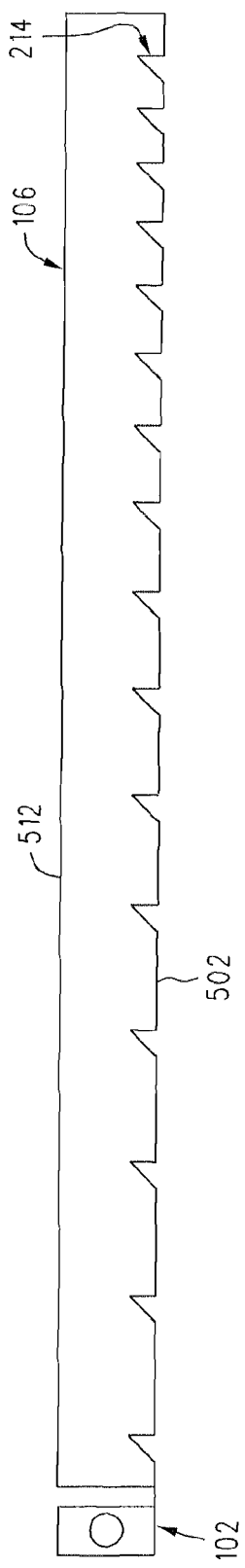
FIG. 2C is a drawing of a light guide, micro-structures and an LED in accordance with an exemplary embodiment of the invention.

FIG. 2C is a drawing of a light guide 106, micro-structures 214 and an LED 102 in accordance with an exemplary embodiment of the invention. The intensity of the light reflected through surface 512 may be varied as a function of location on surface 512 by varying the number of micro-structures 214 formed in an area. For example, in FIG. 2C there are more micro-structures 214 formed on the right side of the light guide 106 than on the left side of the light guide 106. As a result, more light may be reflected on the right side than the left side of the light guide 106. Other patterns may be formed on a surface of a light guide using micro-structures to vary the intensity of the light reflected by the surface.

Figure 3:
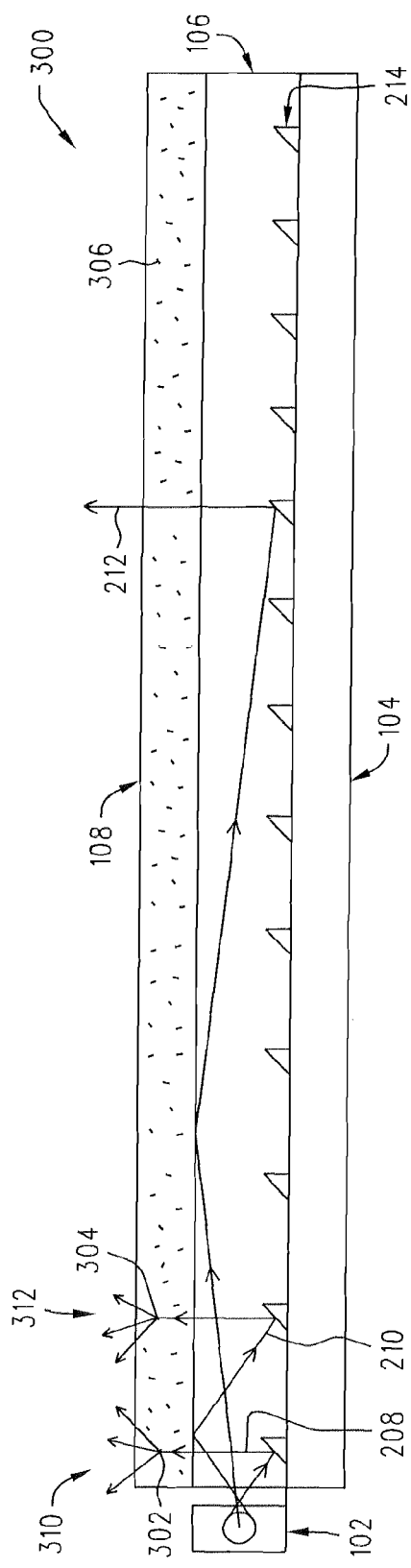
FIG. 3 is a sectional view of a multi-color illuminating back light structure in accordance with an exemplary embodiment of the invention.

FIG. 3 is a sectional view of a multi-color illuminating back light structure 300 in accordance with an exemplary embodiment of the invention. In this exemplary embodiment, a wavelength converter material 108 is deposited on surface 512 of the light guide 106. In this example, reflected light 208, 210 and 212 enters the wavelength converter material 108. The wavelength converter material 108 in this example contains a plurality of phosphor particles, 302, 304 and 306. In this example, each of these phosphor particles emit a different color of light from each other when struck with reflected light.

In another exemplary embodiment (not shown), wavelength converter material 108 is embedded in the light guide 106.

When phosphor particle 302 is struck by reflected light 208, a different wavelength of light 310 from the wavelength of the reflected light 208 is emitted from phosphor particle 302. For example if phosphor particle 302 was comprised of europium phosphor, red light would be generated from phosphor particle 302 if struck by blue light. When phosphor particle 304 is struck by reflected light 210, a different wavelength of light 312 from the wavelength of the reflected light 210 is emitted from phosphor particle 302. For example if phosphor particle 304 was comprised of copper and aluminum doped zinc sulfide, green light would be generated from phosphor particle 304 if struck by blue light. In this example, the reflected light 212 does not strike a phosphor particle. As a result, reflected light 212 passes through the wavelength converter material.

In this exemplary embodiment, the light leaving the wavelength converter material 108 comprises different wavelengths. Because the light leaving the wavelength converter material 108 may have many different wavelengths, multi-color light may be observed emanating from the wavelength converter material 108. For example, a "rainbow" or "jellyfish" color effect may be generated by the multi-color illuminating back light structure 300.

Figure 4:
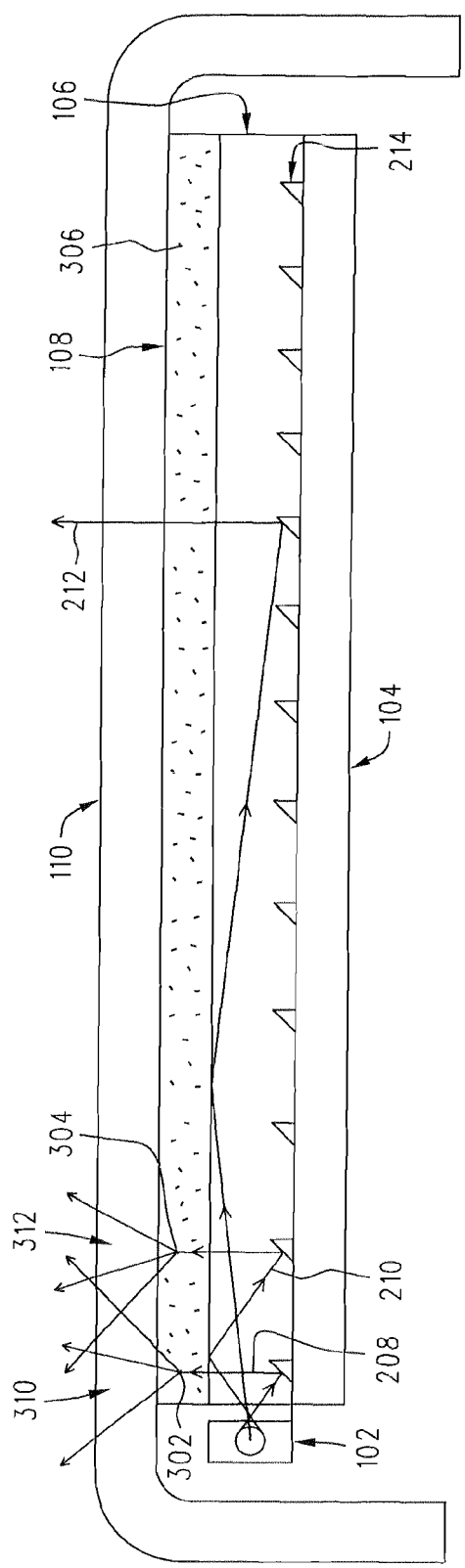
FIG. 4 is a sectional view of a multi-color illuminating back light structure and a casing in accordance with an exemplary embodiment of the invention.

FIG. 4 is a sectional view of a multi-color illuminating back light structure 300 and a casing 110 in accordance with an exemplary embodiment of the invention. In this exemplary embodiment, the multi-color light emanating from the wavelength converter material 108 may be used, for example, to illuminate a translucent or transparent casing 110 used to encase portable electronic equipment. However, the multi-color illuminating back light structure 300 is not limited for use with portable electronic equipment.

In another exemplary embodiment (not shown), the multi-color illuminating back light 300 may be embedded in a casing. In this example, a casing would cover at least two surfaces of the multi-color illuminating back light 300.

Figure 5:
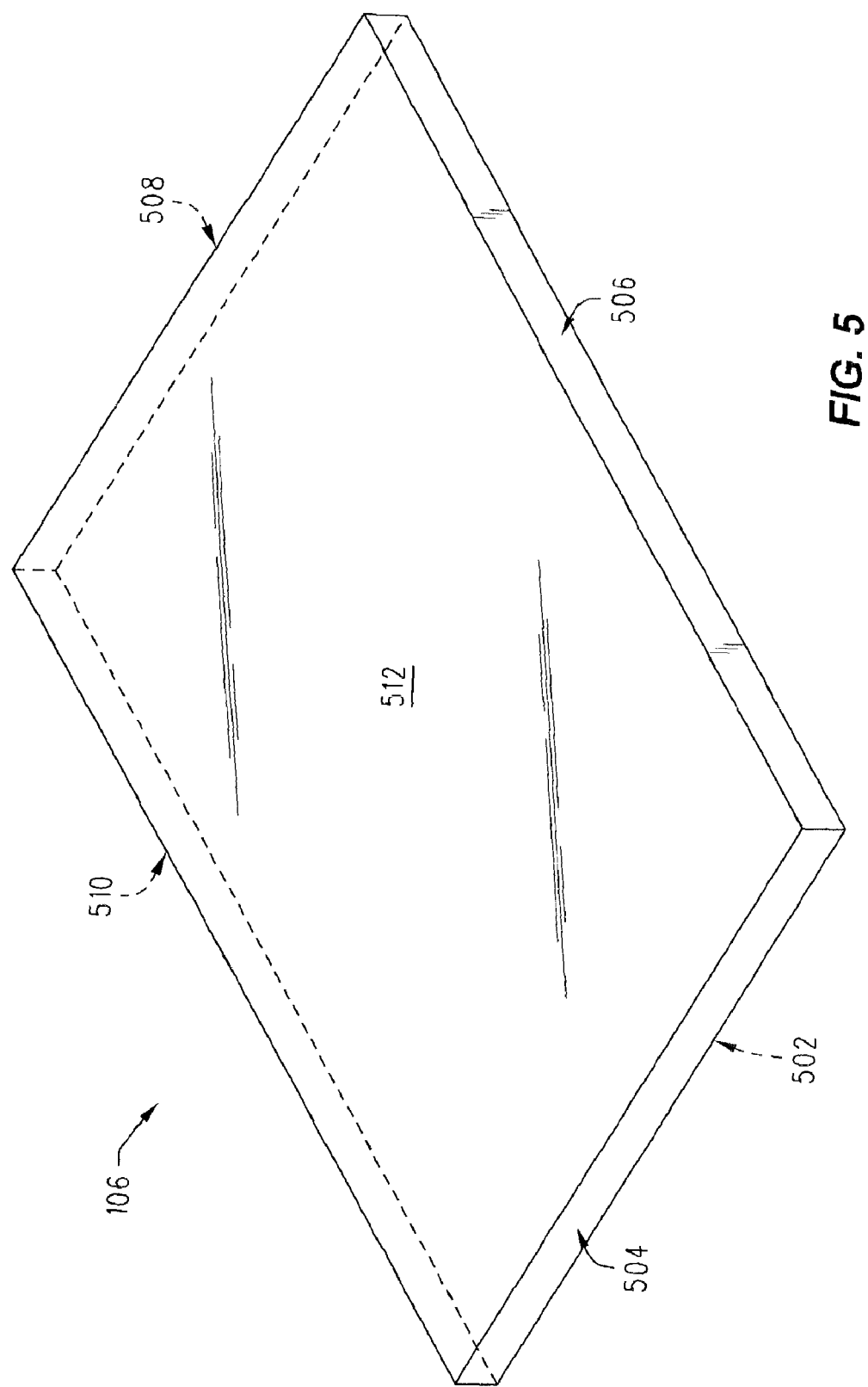
FIG. 5 is an isometric drawing of a light guide in accordance with an exemplary embodiment of the invention.

FIG. 5 is an isometric drawing of a light guide 106 in accordance with an exemplary embodiment of the invention. The light guide 106 shown in FIG. 5 has two surfaces 502 and 512 and four sides 504, 506, 508 and 510. In an exemplary embodiment of the invention, LEDs may be optically coupled to any of the four sides, 504, 506, 508 and 510. In one of to the exemplary embodiments shown previously, surface 502 has micro-structures 214 formed on it. In one of the exemplary embodiments shown previously, surface 502 has a reflector 104 attached to it. The reflector 104 may be a film or a sheet. However, the reflector 104 is not limited to a film or a sheet. The light guide 106 in this example is made of an optical-grade polycarbonate material; however other materials may be used.

Figure 6:
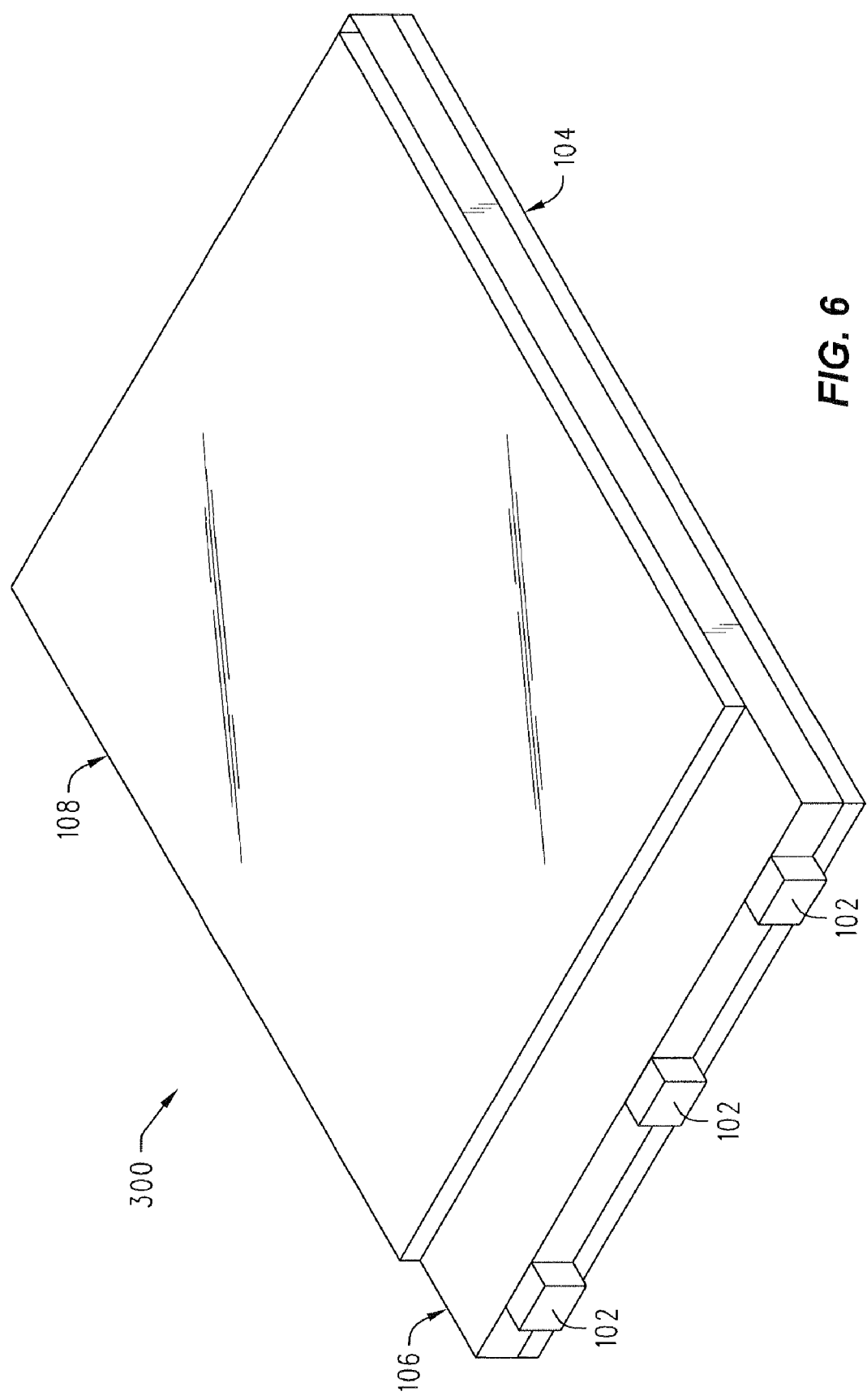
FIG. 6 is an isometric drawing of a multi-color illuminating back light structure in accordance with an exemplary embodiment of the invention.

FIG. 6 is an isometric drawing of a multi-color illuminating back light structure 300 in accordance with an exemplary embodiment of the invention. In this exemplary embodiment, three LEDs 102 are shown, however fewer or more LEDs may be used. In addition, LEDs may be optically coupled to any and all sides 504, 506, 508 and 510 of light guide 106. These LEDs 102 may be any combination of LED types. For example, the LEDs 102 may emit blue light, green light and red light. Electronic circuit drivers (not shown) may be included to drive and control the LEDs 102. However, the LEDs 102 may also be driven and controlled by electronic circuitry external to the multi-color illuminating back light structure 300.

Figure 7:
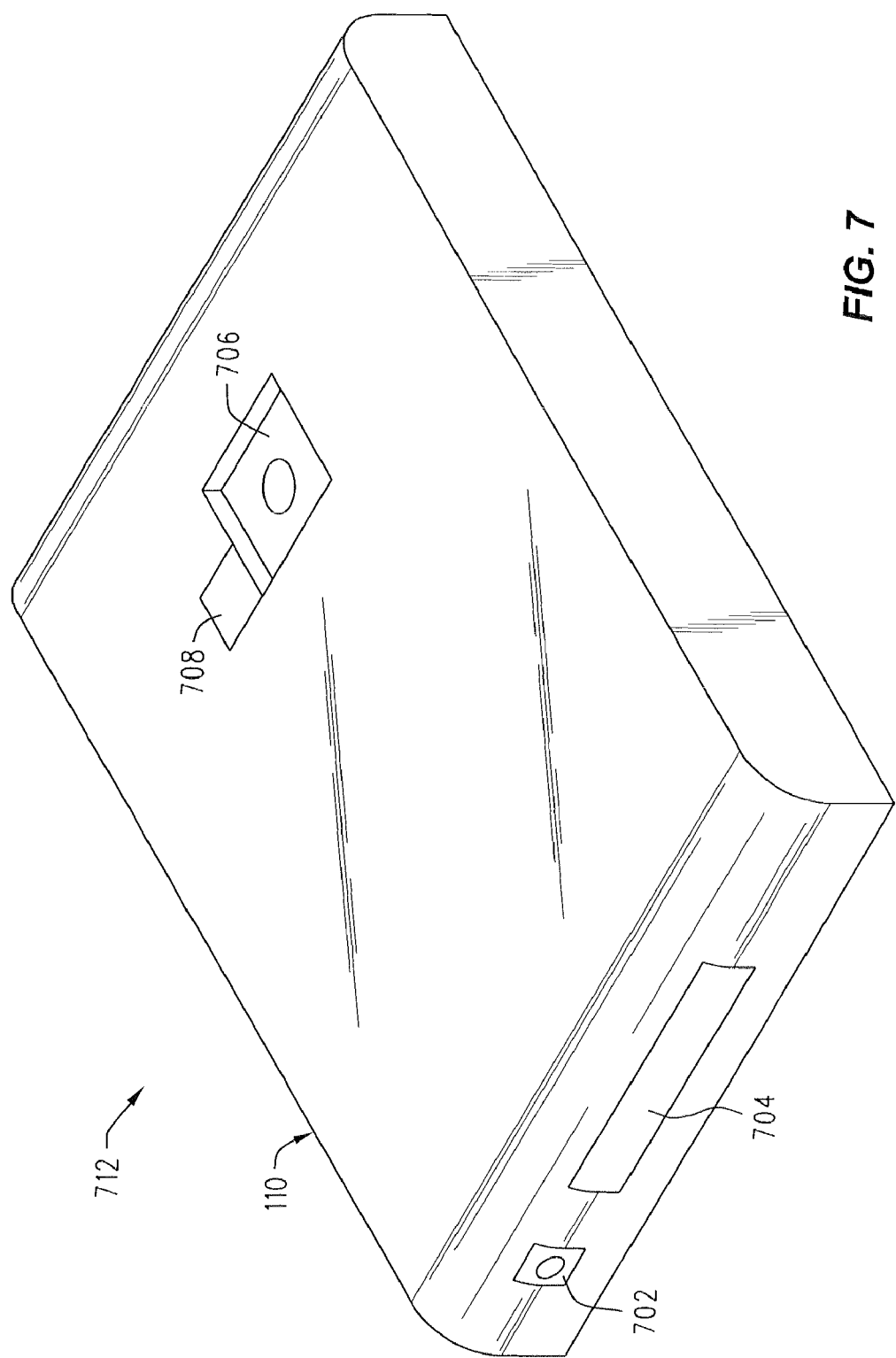
FIG. 7 is an isometric drawing of a PDA (Personal Digital Assistant) containing a multi-color illuminating back light structure in accordance with an exemplary embodiment of the invention.

FIG. 7 is an isometric drawing of a PDA (Personal Digital Assistant) 712 containing a multi-color illuminating back light structure 300 in accordance with an exemplary embodiment of the invention. In this example, a casing 110 covers the PDA 712. The PDA 712 may have, for example, a power receptacle 702, a peripheral port 704, a flash 708 and a camera 706. The multi-color illuminating back light structure 300 (not shown because it is internal to the PDA 712) illuminates the casing 110 with multi-color light. The multi-color light may have a "jelly fish" or "rainbow" effect making the PDA 712 a very attractive device indeed.

Figure 8:
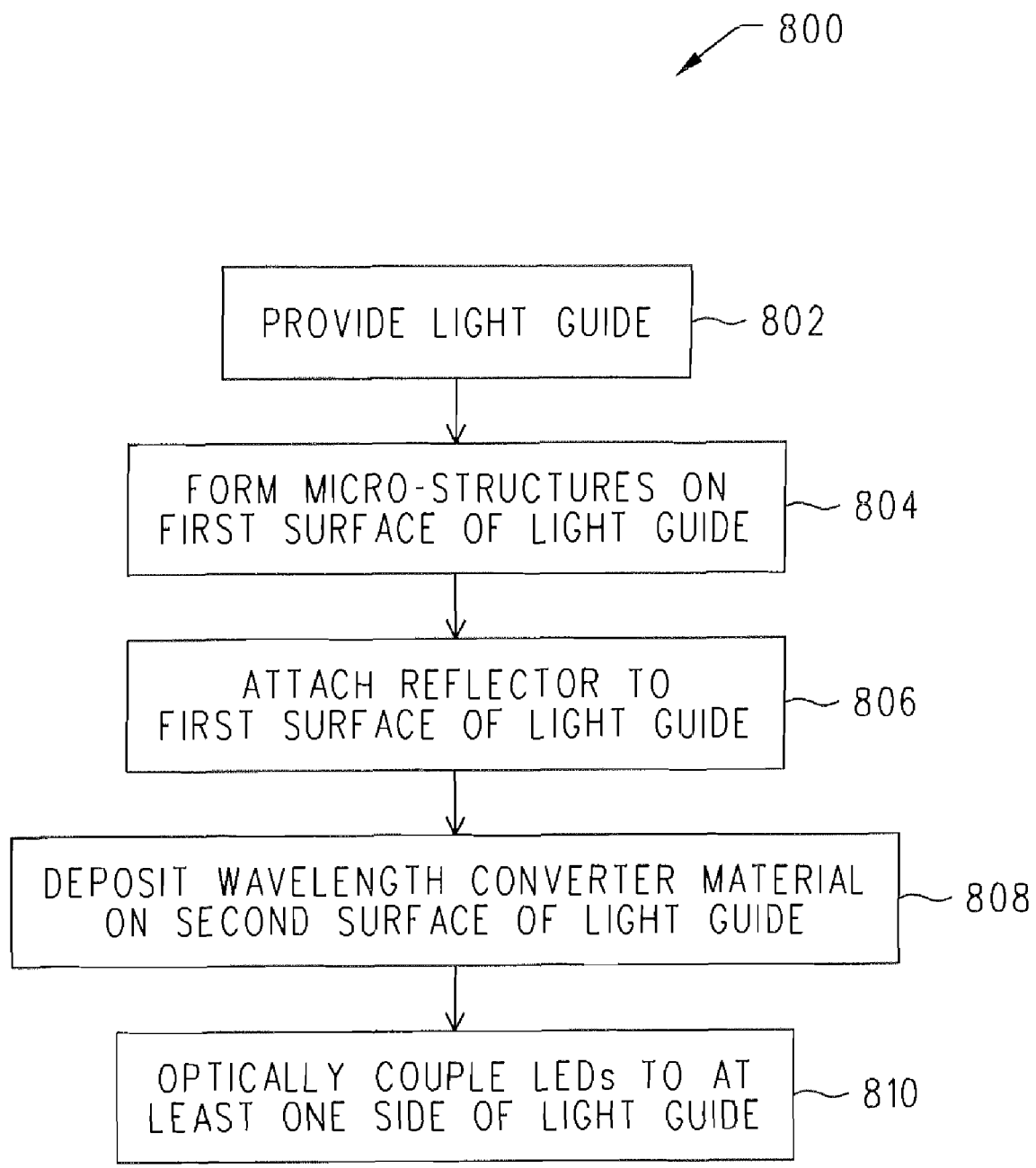
FIG. 8 is a process flow diagram of a method for making a multi-color illuminating back light structure in accordance with an embodiment of the invention.

FIG. 8 is a process flow diagram of a method for making a multi-color illuminating back light structure 300 in accordance with an embodiment of the invention. In this exemplary embodiment, a light guide 106 with two surfaces and four sides is provided as shown in box 802. Next as shown in box 804 micro-structures are formed on a first surface 502 of the light guide 106. In box 806, a reflector 104 is attached to the first surface 502.

Next as shown in box 808 a wavelength converter material 108 is deposited on the second surface 512 of the light guide 106. Next as shown in box 810 at least one LED 102 is optically coupled to at least one side of the light guide 106.

The foregoing description has been presented for purposes of illustration and description. It is not intended to be exhaustive or to limit the invention to the precise form disclosed, and other modifications and variations may be possible in light of the above teachings. The exemplary embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A structure for multi-color decorative illumination from within a casing having an exposed major exterior surface comprising:
   a light guide, the light guide having at least two surfaces and at least four sides;
   a reflector, the reflector attached to a first surface of the at least two surfaces;
   at least one LED, the at least one LED optically coupled to at least a first side, a second side, a third side or a fourth side of the at least four sides;
   a wavelength converter material, the wavelength converter material deposited on a second surface of the at least two surfaces of the light guide; and
   the casing, having the exposed major exterior surface, and further having an interior surface in direct contact with the wavelength converter material;
   wherein micro-structures are formed on the first surface of the at least two surfaces;
   wherein light having a first wavelength is emitted from the at least one LED into the light guide;
   wherein the light having a first wavelength is reflected by the micro-structures into the wavelength converter material;
   wherein the light having a first wavelength is reflected by the reflector into the wavelength converter material;
   wherein a portion of the light having a first wavelength reflected into the wavelength converter material is converted into light having at least a second wavelength;
   wherein light leaving the wavelength converter material comprises light with at least first and second wavelengths into the casing; and
   wherein the wavelength converter material is configured via optical coupling with both the casing and the reflector to receive the light having the first wavelength from the reflector and to transmit the light having at least the first and second wavelengths into the casing, so as to transmit the multi-color decorative illumination from within the casing.

2. The structure of claim 1 wherein the casing optically coupled with the wavelength converter material is translucent.

3. The structure of claim 1 wherein the casing optically coupled with the wavelength converter material is transparent.

4. The structure of claim 1 wherein the wavelength converter material comprises a plurality of types of phosphors that emit light with different wavelengths from each other.

5. The structure of claim 1 wherein the at least one LED is selected from a group consisting of red, blue, green, white, infra-red and ultra-violet LEDs.

6. The structure of claim 1 wherein the micro-structures formed on the first surface of the at least two surfaces are selected from a group consisting of diffusion spots, diffusion groves, diffusion pits and micro-lenses™.

7. The structure of claim 1 wherein the at least one LED further comprises an electronic driver circuits.

8. The structure of claim 1 wherein the light guide is made of optical-grade polycarbonate material.

9. A method of manufacturing a structure for multi-color decorative illumination from within a casing having an exposed major exterior surface, the method comprising:
   providing a light guide, the light guide having at least two surfaces and at least four sides:
   forming micro-structures on a first surface of the at least two surfaces;
   attaching a reflector to the first surface of the light guide;
   depositing a wavelength converter material on a second surface of the at least two surfaces of the light guide;
   covering the wavelength converter material with the casing having the exposed major exterior surface such that an interior surface of the casing is in direct contact with the wavelength converter material; and
   optically coupling at least one LED to at least a first side, a second side, a third side or a fourth side of the at least four sides;
   wherein light having a first wavelength is emitted from the at least one LED into the light guide;
   wherein the light having the first wavelength is reflected by the micro-structures into the wavelength converter material;
   wherein the light having a first wavelength is reflected by the reflector into the wavelength converter material;
   wherein a portion of the light having a first wavelength reflected into the wavelength converter material is converted into light having at least a second wavelength;
   wherein light leaving the wavelength converter material comprises light with at least first and second wavelengths into the casing; and
   wherein the wavelength convertor material is configured via optical coupling with both the casing and the reflector to receive the light having the first wavelength from the reflector and to transmit the light having at least the first and second wavelengths into the casing, so as to transmit the multi-color decorative illumination from within the casing.

10. The method of claim 9 wherein the wavelength converter material comprises a plurality of types of phosphors that emit light with different wavelengths from each other.

11. The method of claim 9 wherein the reflector is a polymer film.

12. The method of claim 9 wherein the reflector reflects nearly all light in the visible spectrum independent of the angle of incidence of the light.

13. A portable electronic device having an exposed major exterior surface comprising:
- at least one structure configured for multi-color decorative illumination from within the portable electronic device; the at least one structure comprising:
- a light guide, the light guide having at least two surfaces and at least four sides;
- a reflector, the reflector attached to a first surface of the at least two surfaces;
- at least one LED, the at least one LED optically coupled to at least a first side, a second side, a third side or a fourth side of the at least four sides;
- a wavelength converter material, the wavelength converter material deposited on a second surface of the at least two surfaces of the light guide; and
- a casing having an exposed major exterior surface that defines the exposed major exterior surface of the portable electronic device, and the casing further having an interior surface in direct contact with the wavelength converter material;
- wherein micro-structures are formed on the first surface of the at least two surfaces;
- wherein light having a first wavelength is emitted from the at least one LED into the light guide;
- wherein the light having a first wavelength is reflected by the micro-structures into the wavelength converter material;
- wherein the light having a first wavelength is reflected by the reflector into the wavelength converter material;
- wherein a portion of the light having a first wavelength reflected into the wavelength converter material is converted into light having at least a second wavelength;
- wherein light leaving the wavelength converter material comprises light with at least first and second wavelengths into the casing; and
- wherein the wavelength converter material is configured via optical coupling with both the casing and the reflector to receive the light having the first wavelength from the reflector and to transmit the light having at least the first and second wavelengths into the casing, so as to transmit the multi-color decorative illumination from within portable electronic device.

14. The portable electronic device of claim 13 wherein the wavelength converter material comprises a plurality of types of phosphors that emit light with different wavelengths from each other.

15. The portable electronic device of claim 13 further comprising a camera disposed within the casing having the exposed major exterior surface that defines the exposed major exterior surface of the portable electronic device.

16. The portable electronic device of claim 13 further comprising a flash disposed within the casing having the exposed major exterior surface that defines the exposed major exterior surface of the portable electronic device.

* * * * *